United States Patent
Kim et al.

(10) Patent No.: US 10,776,521 B2
(45) Date of Patent: Sep. 15, 2020

(54) SECURITY TECHNIQUES BASED ON MEMORY TIMING CHARACTERISTICS

(71) Applicant: Apple Inc., Cupertino, CA (US)

(72) Inventors: Jeremie S. Kim, Canton Zürich (CH); Minesh H. Patel, Canton Zürich (CH); Stephan G. Meier, Los Altos, CA (US); Tyler J. Huberty, Sunnyvale, CA (US); Onur Mutlu, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 514 days.

(21) Appl. No.: 15/679,031

(22) Filed: Aug. 16, 2017

(65) Prior Publication Data

US 2018/0307862 A1    Oct. 25, 2018

Related U.S. Application Data (60) Provisional application No. 62/488,699, filed on Apr. 21, 2017.

(51) Int. Cl.
| | |
|---|---|
| *G06F 21/71* | (2013.01) |
| *H04L 9/32* | (2006.01) |
| *G06F 21/44* | (2013.01) |
| *G06F 21/73* | (2013.01) |
| *G06F 21/72* | (2013.01) |
| *H04L 29/06* | (2006.01) |

(52) U.S. Cl.
CPC ............. *G06F 21/71* (2013.01); *G06F 21/44* (2013.01); *G06F 21/725* (2013.01); *G06F 21/73* (2013.01); *H04L 9/3271* (2013.01); *H04L 9/3278* (2013.01); *H04L 63/0869* (2013.01)

(58) Field of Classification Search
CPC ........ G06F 21/71; G06F 21/44; G06F 21/725; G06F 21/73; H04L 9/3271; H04L 9/3278
See application file for complete search history.

(56) References Cited

U.S. PATENT DOCUMENTS

| | | | |
|---|---|---|---|
| 7,216,050 B1 | 5/2007 | Bachman et al. | |
| 8,848,905 B1* | 9/2014 | Hamlet | H04K 1/04 380/35 |
| 9,613,714 B1 | 4/2017 | Wong et al. | |
| 2002/0186802 A1 | 12/2002 | Morgan et al. | |
| 2007/0123316 A1* | 5/2007 | Little | H04L 9/3271 455/573 |
| 2010/0174955 A1 | 7/2010 | Carnevale et al. | |

(Continued)

*Primary Examiner* — Shanto Abedin
(74) *Attorney, Agent, or Firm* — Kowert, Hood, Munyon, Rankin & Goetzel, P.C.

(57) ABSTRACT

Techniques are disclosed for obtaining data using memory timing characteristics. In some embodiments, a physical unclonable function is used to obtain the data. In various embodiments, a computer system programs a timing parameter of a memory accessible by the computer system to a value that is outside of a specified operable range for the timing parameter. In various embodiments, the computer system performs one or more memory operations to a least a portion of the memory and detects a pattern of errors in the portion of the memory. In some embodiments, the computer system generates a response dependent on the pattern of errors. The response may be used to identify the computer system.

17 Claims, 8 Drawing Sheets

(56) References Cited

U.S. PATENT DOCUMENTS

2010/0246293 A1* 9/2010 Dudeck .................... G11C 7/12
  365/194
2013/0346721 A1 12/2013 Giovannini et al.
2014/0126306 A1* 5/2014 Otterstedt ................ G11C 7/06
  365/189.07

* cited by examiner

SECURITY TECHNIQUES BASED ON MEMORY TIMING CHARACTERISTICS

RELATED APPLICATIONS

The present application claims priority to U.S. Provisional Appl. No. 62/488,699, filed Apr. 21, 2017, which is herein incorporated by reference in its entirety.

BACKGROUND

Technical Field

This disclosure relates generally to computer identification and, more specifically, to a challenge-response authentication protocol.

Description of the Related Art

Computer systems are typically not in isolation, but instead, communicate with other computer systems across a network—e.g., the Internet. When two computer systems prepare to communicate with each other, one of the two systems (or both in some cases) may attempt to identify the other (or the user behind it). This interaction generally involves one of the two systems presenting a question to which the other system needs to provide a valid answer. For example, one system may request a password in order to access an account to which the other system may respond with a possibly valid answer (e.g., a password) received from a user.

SUMMARY

The present disclosure describes embodiments in which physical characteristics of a computer system are used to obtain data, for example, to be used in a challenge-response authentication protocol. In some embodiments, a physical unclonable function (PUF) is used for obtaining data such as errors produced in association with operating on the PUF. In some embodiments, a computer system programs a timing parameter of a memory that is accessible by the computer system to a value that is outside of a specified operable range for the timing parameter. In various embodiments, the timing parameter is a Row Address to Column Address Delay (tRCD) that is associated with the memory. In various embodiments, the computer system performs one or more operations on a portion of the memory and detects a pattern of errors associated with the memory portion. The one or more operations may include reading data from the memory portion. In some embodiments, the computer system generates a response dependent on the pattern of errors. The response may identify the computer system to another system.

In some embodiments, a computer system sends a request to another computer system that specifies a timing value. In such embodiments, the other computer system is configured to operate on a memory segment in accordance with the timing value. The timing value may be a tRCD. In various embodiments, the computer system receives, from the other computer system, a response identifying a set of errors that occurred when the other computer system operated on the memory segment in accordance with the timing value. In some embodiments, the computer system compares the response against valid responses to determine a match. In response to determining a match between the response and one of the valid responses, in some embodiments, the computer system notifies the other computer system that it has been verified.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory structure configured to receive a request for a block of data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a memory structure having eight memory cells, the terms "first" and "second" cells can used to refer any two of the eight memory cells.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

This interaction in which one system must respond with a valid answer to a question presented by another system (in order to be authenticated) may be referred to as "challenge-response authentication" (CRA). CRA may be used to describe a family of protocols ranging from simple ones such as the password example discussed earlier to more complex protocols that are based on concepts such as zero-knowledge proofs. In some cases, CRA may involve exploiting the physical properties of a system in order to generate a valid response. Physical unclonable functions (PUFs) may be used to generate this response. As used herein, the term "physical unclonable function" is to be interpreted in accordance with its understood meaning in the art and refers to the properties embodied in the physical structure of a system that cause the physical structure to react in a certain way. The term "unclonable" (in PUF for example) is not meant to refer to a structure being impossible to clone, but rather refers to the fact that it may be extremely difficult to clone the structure. Just as a mathematical function takes in some input and produces an output, a PUF receives a physical stimulus (i.e., an input) that is applied to the physical structure causing the structure to react in a particular manner (i.e., an output).

The present disclosure describes embodiments in which physical characteristics of a computer system are used as a PUF for generating (or deriving) data. This data may be used, for example, as a response in a CRA protocol. In embodiments described below, the data is generated by applying a stimulus to a memory structure of a computer system, causing the structure to react in an unpredictable (in the sense that without having tested the memory structure, one could not predict how it would react) yet repeatable manner. This reaction by the memory structure may then be used as a response (or to generate a response) in the CRA protocol. In one implementation, for example, a computer system includes a memory (e.g., DRAM) that it configures (or programs) to operate under a specified timing constraint. The timing constraint may be a certain value that is outside of a specified operable range for the memory. In such an implementation, the computer system performs operations to a region of the memory and collects data about how the memory region operates under the specified timing constraint. This data may be unique to the computer system. Operating the memory region under the timing constraint may result in errors (e.g., a pattern of errors) occurring in the region. Since the pattern of errors may be unique to the system/device, the pattern may serve as a response in the CRA protocol. In such an implementation, the PUF is embodied in the memory structure and it receives the timing value as an input and produces a pattern of errors as an output.

Generating (or deriving) data for a response in this manner may be advantageous over prior approaches (such as password-based authentication) since the physical characteristics of a memory structure may be very difficult (if not impossible) to duplicate/clone. As such, this approach may provide a reliable way for identifying computer systems without being easily susceptible to both physical and software-based attacks. This approach may also be carried out in a quicker and more efficient manner than other types of PUFs such as gate delay-based PUFs or retention-based PUFs.

Figure 1:
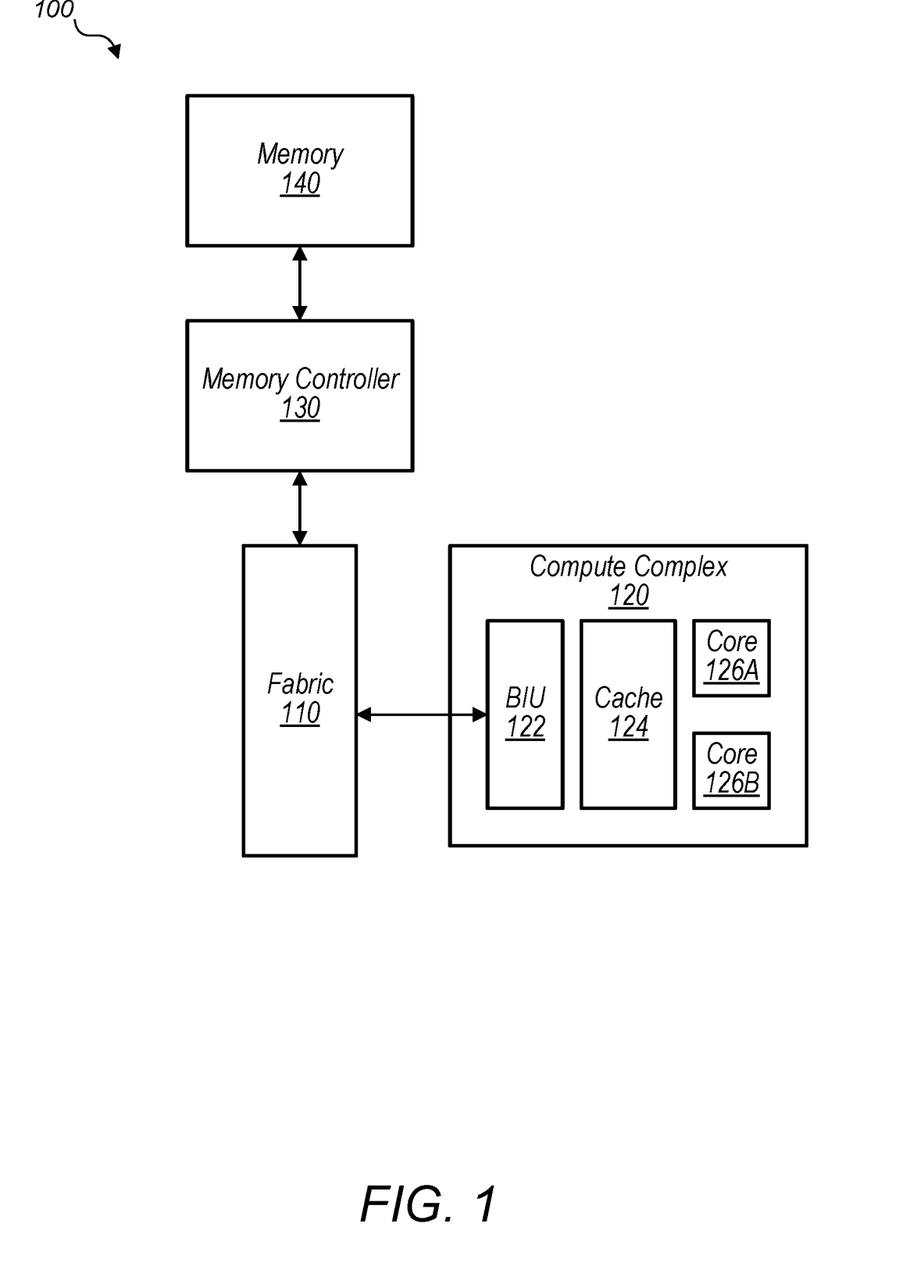
FIG. 1 is a block diagram illustrating an exemplary computer system, according to some embodiments.

Turning now to FIG. 1, a block diagram of a computer system 100 is shown. In some embodiments, at least some elements of system 100 may be included within a system on a chip (SOC). In the illustrated embodiment, system 100 includes a fabric 110, a processor complex 120, a memory controller 130, and a memory 140. In various embodiments, system 100 also includes a graphics unit, a display unit, and various other components. System 100 may be any of various types of s, including, but not to be limited to, a server system, personal computer system, desktop computer, laptop or notebook computer, mainframe computer system, tablet computer, handheld computer, workstation, network computer, or consumer system such as a mobile phone, music player, or personal data assistant (PDA). The system 100 may also implement various functionality by executing program instructions embodied in a non-transitory computer readable medium.

Fabric 110 may include various interconnects, buses, MUX's, controllers, etc., and may be configured to facilitate communication between various elements of system 100. In some embodiments, portions of fabric 110 may be configured to implement various different communication protocols. In other embodiments, fabric 110 may implement a single communication protocol and elements coupled to fabric 110 may convert from the single communication protocol to other communication protocols internally. As used herein, the term "coupled to" may indicate one or more connections between elements, and a coupling may include intervening elements.

In the illustrated embodiment, processor complex 120 includes bus interface unit (BIU) 122, cache 124, and cores 126A and 126B. In various embodiments, processor complex 120 may include various numbers of processors, processor cores, and/or caches. For example, processor complex 120 may include 2 or 4 processor cores, or any other suitable number. In some embodiments, cores 126A and/or 126B may include internal instruction and/or data caches. BIU 122 may be configured to manage communication between processor complex 120 and other elements of system 100. Processor cores such as cores 126 may be configured to execute instructions of a particular instruction set architecture (ISA), which may include operating system instructions and user application instructions. These instructions may be stored in computer readable medium such as a memory coupled to memory controller 130.

Memory controller 130 may be configured to manage transfer of data between fabric 110 and memory 140. Memory 140 coupled to controller 130 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory 140 coupled to controller 130 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 120 to cause system 100 to perform functionality described herein.

Figure 2:
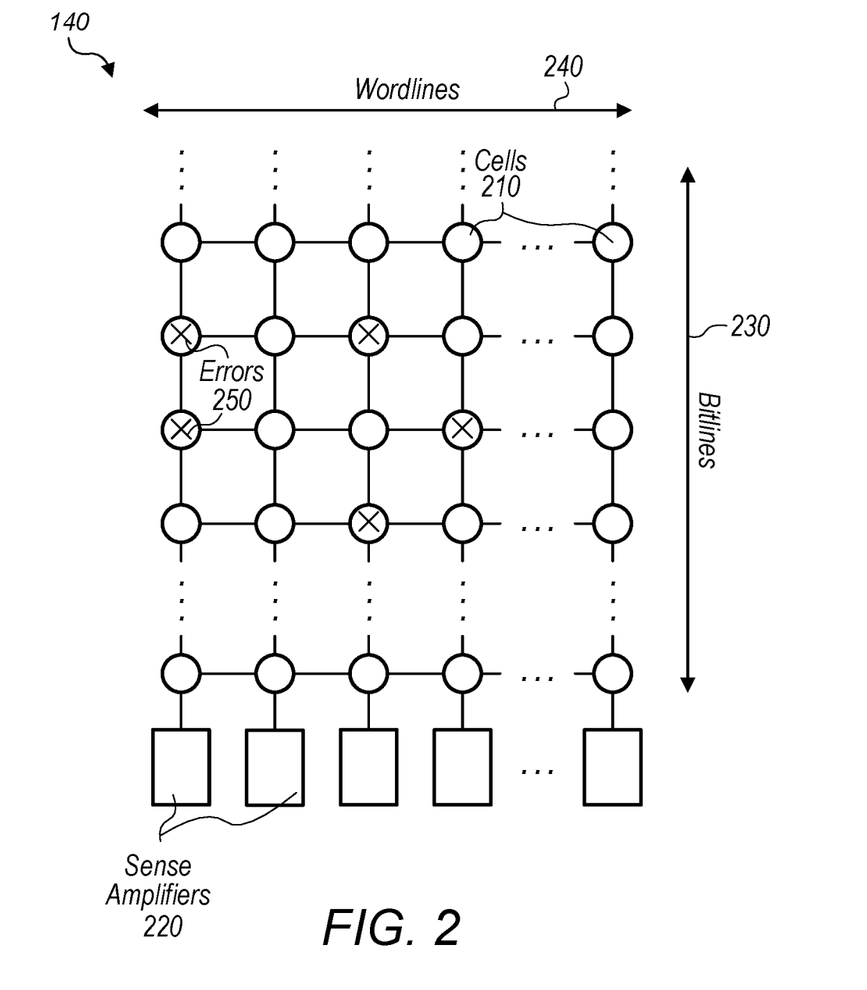
FIG. 2 is a block diagram illustrating exemplary elements of a memory, according to some embodiments.

Turning now to FIG. 2, a block diagram of a region of a memory 140 is shown. In the illustrated embodiment, memory 140 includes cells 210 and sense amplifiers 220. As shown, in various embodiments, cells 210 are arranged in an array of columns (e.g., bitlines 230) and rows (e.g., wordlines 240) such that a particular cell 210 may be accessed by supplying an address that decodes to a wordline 240. The particular cell 210 may receive data (for a write) or provide data (for a read) via one or more bitlines 230. Each cell 210 may store an amount of charge representative of one bit of binary information (e.g., a logical 1 or 0). In various embodiments, each bitline 230 may be coupled to a particular sense amplifier 220 configured to amplify small voltages to levels that may be interpreted by system 100 as either a logical 1 or 0. The region/segment of memory 140 may consist of 8 kilobytes of storage (or a couple of DRAM rows), but other sizes are permissible.

When reading from (or writing to) memory 140, memory controller 130 may send an address for data to memory 140. In various embodiments, memory 140 decodes the address into a row address and a column address. In preparation for reading the data from the row address, memory 140 may precharge bitlines 230 to a set voltage. Thereafter, memory 140 may drive or activate the wordline 240 associated with the row address, allowing the charges stored by cells 210 in that wordline 240 to affect the set voltages on bitlines 230. In various embodiments, sense amplifiers 220 (coupled to bitlines 230) amplify the voltages on bitlines 230 to a level interpretable as either a logical 1 or 0 (for the read operation). Afterwards, memory 140 may select a subset of the data provided by amplifiers 220 using the column address and provide the subset of data to memory controller 130 and subsequently, to other components of system 100. For a write operation, the memory may drive the bitlines 230 to represent the data that is to be written to the cells 210 selected by the activated wordline 240.

In various embodiments, the timing characteristics of memory 140 may be adjusted to affect its ability to read and write data to cells 210. In some embodiments, the Row Address to Column Address Delay (tRCD) is adjusted in a manner that may cause errors 250 to occur when reading particular cells 210. (As used herein, the term "tRCD" is to be interpreted in accordance with its understood meaning in the art and refers to the minimum number of clock cycles between issuing a command to activate a row of memory and being able to access a column of the row.) In some embodiments, these timing characteristics may be adjusted by memory controller 130, and in other embodiments, the timing characteristics may be adjusted by other processing devices in communication with memory 140. By reducing the number of cycles for the tRCD, a sense amplifier 220 may not have enough time to amplify the voltage on the coupled bitline 230 to a logical level that may be recognized as the bit that is stored in the respective cell 210. Accordingly, in various embodiments, errors 250 may occur where a sense amplifier 220 cannot amplify the voltage to the correct logical level (representative of the stored bit). For example, cells 210 within the memory region may store a charge that is representative of a logical 1; however, logical 0s may be detected for some of the cells 210, resulting in errors 250. In various embodiments, whether reading a particular cell 210 results in an error 250 depends on the physical characteristics of its structure (and/or memory 140), which itself may depend on random factors such as process variations introduced during manufacturing that may be unique for each structure that is manufactured. Thus, it may be difficult to manually replicate these structures (e.g., cells 210 and memory 140). Because errors 250 may be unique to a particular memory structure, in various embodiments, detected errors 250 are used as a response in a CRA protocol.

In various embodiments, some regions/segments of memory 140 may be better suited for use as a PUF compared to other regions. In particular, temperature variations may cause particular regions of memory 140 to produce more inconsistent errors 250 and subsequently more inconsistent error patterns. That is, operating on these particular regions multiple times may result in different responses and thus attempting to identify a system 100 based on these particular regions may be undesirable. Accordingly, in some embodiments, system 100 tests various regions of memory 140 to determine the effects of temperature variance on them and based on the effects, may select a subset of the regions for use in generating responses. The selected regions may be those who are least affected by temperature variation. For example, assuming two regions are initially tested at 50° C., the two regions may produce error patterns having Intra-Jaccard index values greater than 0.8. (In this instance, the Intra-Jaccard index describes the similarity between two error patterns generated with the same input parameters (e.g., tRCD). As an example, two patterns "11110" and "11111" may have an index value of 0.8 as they differ on the last bit whereas two other patterns "10001" and "11111" may have a lower value of 0.4 as they have a more notable difference.) When the two regions are tested at 60° C., one region may still produce Intra-Jaccard index values greater than 0.8, however, the other region may produce Intra-Jaccard index values between 0.4 and 0.6. Accordingly, in some embodiments, the region producing the greater index values is selected for use in generating responses. In some cases, regions may be selected based on them having an Intra-Jaccard index value that satisfies some threshold value (e.g., greater than 0.8) or having an amount of inconsistent errors satisfying some threshold value (e.g., less than, greater than, etc.). In some embodiments, other metrics are used for comparing two PUF evaluations such as the Hamming distance. (The Hamming distance indicates the number of positions at which corresponding characters are different between two equal length patterns. For example, the Hamming distance between patterns "10001" and "11111" is 3.)

In some embodiments, other environmental variations may be taken into consideration (when selecting regions of memory 140) including, for example, electromagnetic interference and power supply noise.

Figure 3A:
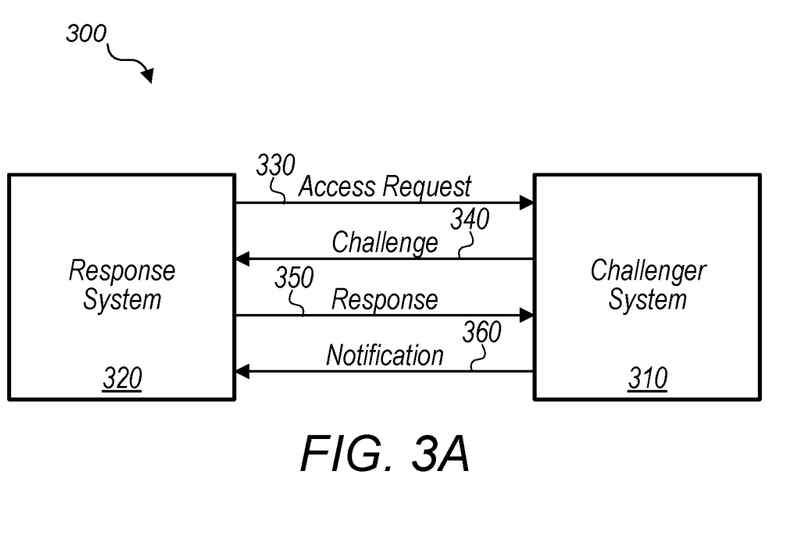
FIG. 3A is a block diagram illustrating exemplary elements of a system in which two or more computer systems communicate with each other, according to some embodiments.

Turning now to FIG. 3A, a block diagram of one embodiment of a system 300 is shown that implements a CRA protocol. The CRA protocol may be based on errors 250 detected in a particular region of memory 140 as described above. In the illustrated embodiment, system 300 includes a challenger system 310 and a response system 320. In various embodiments, systems 310 and 320 perform the CRA protocol in which system 310 challenges system 320 to provide a valid answer to the challenge. In doing so, system 310 may verify the identity of system 320. In some embodiments, systems 310 and 320 implement system 100 as discussed in FIG. 1 and as such, system 320 may include a memory 140. In some embodiments, system 300 may be implemented differently than shown.

Before challenger system 310 challenges response system 320, in some embodiments, system 310 first collects and stores valid responses 350 (e.g., error patterns based on errors 250) from system 320. In some cases, this may be performed while system 320's identify is known to system 310 so that a malicious attacker cannot deceive system 310. For example, valid responses 350 may be collected from system 320 while it is still in the facility where it was manufactured. In some embodiments, once system 320 is deemed trustable, system 310 may first instruct system 320 to identify regions (of its memory 140) suitable for generating valid responses 350. As described above, system 320 may select the regions based on how they are affected by environmental variations such as temperature. In addition to learning of suitable regions from system 320, in various embodiments, system 310 gathers information about the operating ranges of the timing parameters/characteristics of system 320's memory 140. In various cases, these operating ranges describe bounds in which the memory 140 may operate without their being significant errors 250. That is, it may be acceptable to use values within these bounds during normal operations of system 320, but going beyond the bounds may produce more errors 250 than desirable for normal operations. In various embodiments, system 310 selects value that are outside the specified operating ranges for system 320 to use in generating responses 350 (as system 320's memory 140 may produce more errors 250 and thus varying error pattern further distinguishing system 320 from other systems).

Once system 320 has gathered information about suitable memory regions for system 320 and the operating ranges of system 320's memory 140, in various embodiments, system 310 generates various combinations that include a suitable memory region and a value under which to operate the memory 140. Thereafter, system 310 may iteratively sends ones of the combinations to system 320 and store the respective responses 350. These response 350 may be used to identify system 320 in subsequent communications in which system 320's identify is not known. After storing responses 350, in some embodiments, system 310 may challenge system 320 in, for example, the CRA protocol.

Response system 320, in various embodiments, initiates the CRA protocol by sending an access request 330 to challenger system 310 for a resource stored by system 310. In some cases, the authentication protocol may be initiated to achieve a different end; for example, in order to activate features of response system 320, challenger system 310 may initiate the CRA protocol by challenging system 320. In various embodiments, challenger system 310 challenges response system 320 by sending a challenge 340 specifying a particular region (in some cases, pseudorandomly selected from the suitable regions) of system 320's memory 140 and a particular tRCD to be used when addressing the memory region. In some cases, challenge 340 simply specifies a particular tRCD and leaves the selection of the memory region to system 320 or it specifies a particular tRCD and a particular memory channel. However, challenge 340 may specify any other component of system 100 or operational setting—e.g., challenge 340 may specify other memory timing parameters or memory latency settings, such as a Column Access Strobe (CAS) latency, a Row Precharge Time (tRP), or a Row Active Time (tRAS) in place of the particular tRCD. In various instances, challenge 340 may specify more than one timing parameter—e.g., specifies tRCD and tRP. Alternatively, the challenger system 310 may simply challenge the system 320 to identify itself. Internally, the response system 320 may record the tRCD setting (or other parameter setting) and the region of memory 140 used to generate response 350 (e.g., error pattern) and provide response 350 based on this recorded information.

In preparation for generating a response 350, response system 320 may store any data currently in the memory region (that is specified in challenge 340) at another memory region or another storage device (in order to prevent corruption of that data as a certain process may be using that region). (The process using the memory region may be informed that the data has been moved—e.g., by updating a memory page). System 320 may then replace the data in the memory region with logical is (in some cases, 0s); however, the data may be replaced with any various combination of 1s and 0s. Once all preparations have been made, in some embodiments, system 320 configures its memory 140 to apply (or operate under) the timing characteristics specified by the particular tRCD when reading (or writing) from the memory region. With the timing characteristics set, system 320 may read data from the region. In various embodiments, system 320 determines any errors 250 that have occurred when reading data by comparing the read data to the data stored during the preparation. As an example, system 320 may write a block of data having the value "111111," but may read out "10011" (the two 0s being an example of errors 250). In some embodiments, challenge 340 specifies the block of data to be initially written to the memory region.

In various embodiments, system 320 performs multiple iterations of read operations on the memory region to determine which cells 210 produce errors 250 consistently. That is, due to random factors that affect memory 140 (e.g., temperature and interference), some cells 210 may occasionally produce an error 250 than they otherwise would have. Accordingly, in various embodiments, system 320 applies a filter to the multiple iterations in order to remove inconsistent errors 250. For example, system 320 may detect patterns that include "00011," "10011," "10011," "10011," and "10011" and from these patterns, determine that the first bit is supposed to be a "1" despite the first pattern indicating a "0". After determining a pattern of errors 250, in various embodiments, system 320 sends a response 350 to challenger system 310 that indicates the pattern of errors 250 (or where errors 250 did not occur). Continuing with the example above, response 350 may specify the value "10011." In some instances, errors 250 may be used to generate or derive information that is included in response 350.

In some embodiments, challenger system 310 compares the received response 350 to valid responses 350 that are stored at system 310. System 310 may determine whether there is an exact match between two error patterns or may calculate an Intra-Jaccard index value, a Hamming distance, etc. In some embodiments, system 310 determines that a response 350 is valid based on a calculated metric satisfying a threshold value. As an example, the Hamming distance between two 1000-character error patterns may be 2—satisfying a threshold value by having less than 5 differences. In various embodiments, system 310 sends a notification 360 to system 320 indicating that system 320 has been verified in response to response 350 matching a valid response 350. In other embodiments, system 310 sends notification 360 to indicate that response 350 has been rejected as it does not match any valid responses 350.

Figure 3B:
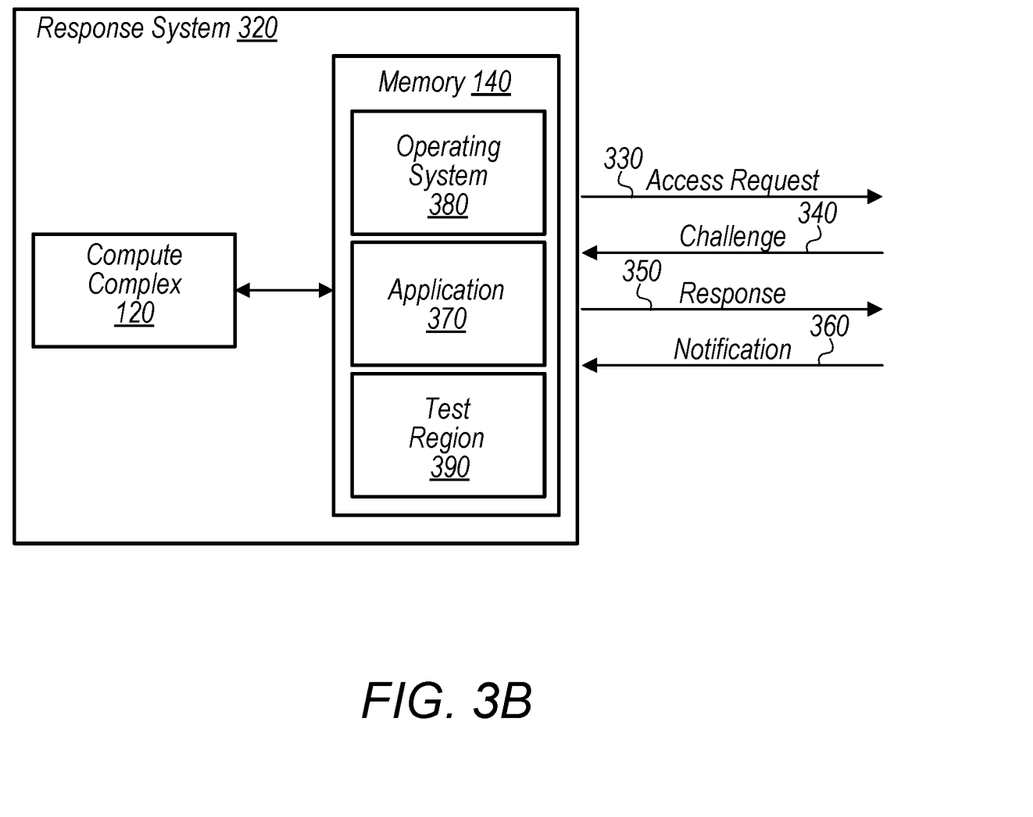
FIG. 3B is a block diagram illustrating exemplary elements of a response system in a challenge-response authentication protocol, according to some embodiments.

Turning now to FIG. 3B, a block diagram of one embodiment of response system 320 is shown. As discussed above, system 320 may take part in a CRA protocol in which system 320 provides a response 350 to a challenge 340. In the illustrated embodiment, system 320 includes a compute complex 120 and a memory 140. (For simplicity, other components such as memory controller 130 and fabric 110 have been omitted from the figure.) As also shown, memory 140 includes an application 370, an operating system (OS) 380, and a test region 390. In various embodiments, application 370 and OS 380 are executable by cores 126 in complex 120 to implement their respective functionalities. While OS 380 is described below as performing various actions (in conjunction with hardware), in some embodiments, some or all of these actions may be performed by another application (such as application 370) or by hardware. In various embodiments, OS 380 includes application 370. In some embodiments, system 320 may be implemented differently than shown—e.g., includes specialized hardware that performs some or all of the functions of OS 380 and/or application 370 described below.

Application 370, in various embodiments, is a software routine that implements some functionality desired by a user. Application 370 may be, for example, a browser application, a server application, a database application, etc. In various embodiments, application 370 includes program instructions that when executed implement part of the CRA protocol (e.g., operations performed by system 320) discussed in FIG. 3A. In implementing part of the CRA protocol, in various embodiments, application 370 sends access request 330 to system 310 after being instructed to do so by a user (e.g., a user selecting a button to access an account), although application 370 may send access request 330 at its own behest. Application 370 may receive challenge 340 from system 310 as a response to sending request 330. In various embodiments, application 370 configures memory 140 (via a memory controller) to operate using a timing parameter specified in challenge 340 and then writes data to and reads data from test region 390 in order to obtain errors 250. (In some embodiments, test region 390 is a region of memory 140 that may be specified in challenge 340 and is used for obtaining errors 250.) Thereafter, application 370 may generate a response 350 dependent on the errors 250. In some embodiments, however, application 370 may not have the needed permission to configure the operational settings of memory 140 and as such, communicates with OS 380 to configure memory 140.

Operating system 380, in various embodiments, is a collection of software routines for managing hardware and software resources and for providing services for applications (e.g., application 370). Additionally, OS 380 may include software routines that implement various functionalities such as a calendar, an email service, a texting service, a web browser, a music service, etc. (As mentioned above, OS 380 may include application 370). In some embodiments, OS 380 facilitates the generation of response 350 by configuring memory 140 to operate on a test region 390 using a timing parameter that is specified in challenge 340. In some embodiments, OS 380 issues instructions to a memory controller (e.g., controller 130) to adjust the specified timing parameter used when operating on test region 390. OS 380 may do so in response to a request from application 370. In some embodiments, OS 380 may also write predetermined data to test region 390 and read it back out in order to obtain errors 250; in other embodiments, application 370 does so as it may have permission to write to test region 390. After obtaining errors 250, in some embodiments, application 370 generates and sends response 350 to system 310.

In some embodiments, application 370 may send request 330, receive challenge 340, cause memory 140 to operate using a certain timing parameter, obtain errors 250 (by writing and reading data from test region 390), and generate a response 350. In other embodiments, OS 380 performs some or all of these operations instead of applications 370. (That is, these operations may be distributed between OS 380 and application 370 in any combination.) For example, during an OS software update, OS 380 may wish to identify system 320 to system 310, which stores the software update. Accordingly, OS 380 may perform all the operations discussed above to carry out system 320's part of the CRA protocol.

Figure 4:
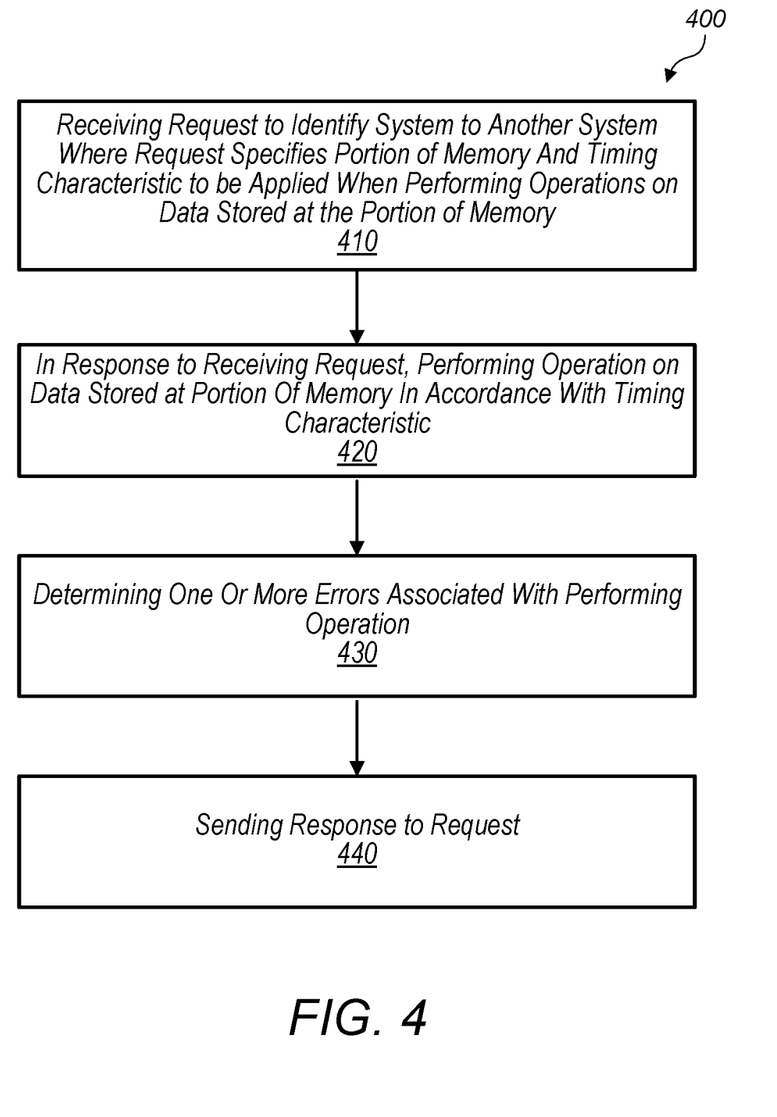
FIG. 4-5 are flow diagrams illustrating an exemplary method for generating a response based on a memory timing characteristic, according to some embodiments.

Turning now to FIG. 4, a flow diagram of a method 400 is shown. Method 400 is one embodiment of a method performed by a computer system such as response system 320 to provide a response (e.g., response 350) to a request (e.g., challenge 340) issued from another computer system (e.g., challenger system 310). In some cases, the response provided by the computer system may be used to identify the computer system to the other computer system (e.g., 310). In various embodiments, the steps of method 400 may include additional steps—e.g., the enrollment process described above in which the other computer system collects and stores valid responses from the computer system.

Method 400 begins in step 410 with a computer system receiving a request to identify itself to another computer system where the request specifies a portion (e.g., test region 390) of the computer system's memory (e.g., memory 140) and a timing characteristic (e.g., tRCD) to be applied when performing operations on the portion. The request may be received in response to an initial request for access to a resource stored by the other computer system. In various cases, the request may be sent as the other computer system may wish to activate a feature of the computer system (e.g., 320) upon validating the computer system. Prior to receiving the request, in some embodiments, the computer system sends a set of valid response usable to identify the computer system for subsequent requests including the request. Accordingly, the other computer system may compare responses to the subsequent request with ones of the set of the valid responses.

In step 420, the computer system performs an operation on data stored at the portion of the memory in accordance with the timing characteristic. In some instances, the operation includes reading data from the portion of the memory. As such, in some embodiments, prior to performing the operation, the computer system stores predetermined data at the portion of the memory such that errors detected at the portion are indicative of differences between data that is read and the predetermined data that is stored.

In step 430, the computer system determines one or more errors (e.g., errors 250) that are associated with performing the operation. In some embodiments, the computer system's memory includes a plurality of cells (e.g., 210) configured to store electrical charges that are representative of logical bits. In such embodiments, the memory may also include a plurality of amplifiers (e.g., 220) configured to amply the electrical charges to levels identifiable by the computer system as the logical bits (e.g., 0s and 1s) represented by the electrical charges. In various embodiments, the one or more errors result from a set of the plurality of amplifiers failing to amply the electrical charges to the identifiable levels. The one or more errors may be usable to identify the computer system.

In step 440, the computer system sends a response to the request. The response may include a set of the one or more errors. In various embodiments, the computer system may iteratively perform the operations to determine errors that are consistently detected and create the set of the one or more errors by removing inconsistent errors from the one or more errors.

Figure 5:
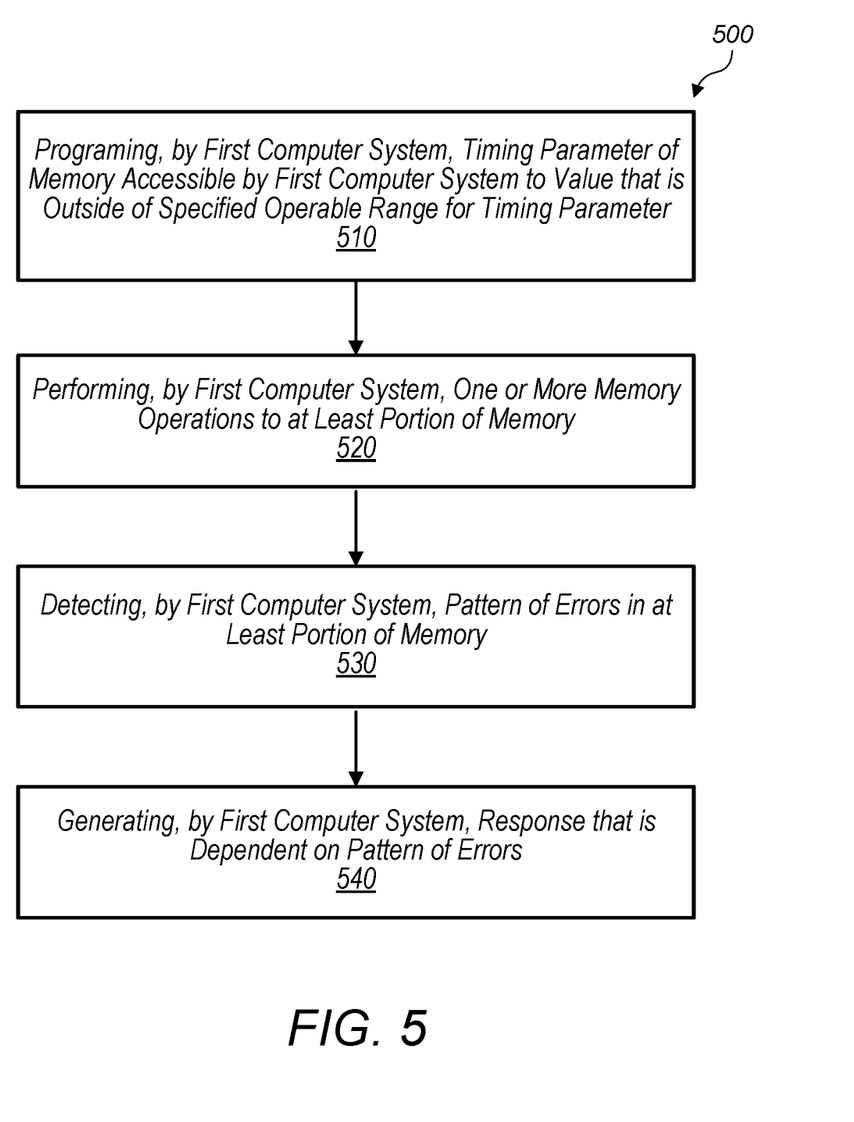

Turning now to FIG. 5, a flow diagram of a method 500 is shown. Method 500 is one embodiment of a method performed by a first computer system (e.g., system 320) to identify itself to a second computer system (e.g., system 310). In various embodiments, the steps of method 500 may include additional steps—e.g., selecting a set of memory regions (e.g., test regions 390) based on effects of temperature variance on those regions.

Method 500 begins in step 510 with a first computer system programming a timing parameter of a memory (e.g., memory 140) accessible by the first computer system to a value that is outside of a specified operable range for the timing parameter. In some embodiments, the first computer system performs a challenge-response authentication (CRA) protocol (as described in FIG. 3) involving the second computer system in which the second computer system challenges (e.g., challenge 340) the first computer system to provide a valid response (e.g., a valid response 350) identifying the first computer system. The timing parameter may be a Row Address to Column Address Delay associated with the memory.

In step 520, the first computer system performs one or more memory operations to at least a portion of the memory. In some embodiments, the first computer system determines a set of portions of the memory detected as causing patterns of errors having a similarity value (e.g., an Intra-Jaccard value) satisfying a threshold value (e.g., greater than 0.8). (That is, the first computer system may determine at least one memory portion that produces similar error patterns over multiple iterations.) The first computer system may select the at least a portion of the memory from the selected set of portions.

In step 530, the first computer system detects a pattern of errors (e.g., errors 250) in the at least a portion of the memory. In various embodiments, the first computer system may perform multiple iterations of the one or more memory operations to determine inconsistent and consistent errors. In some embodiments, the first computer system initializes at least a portion of the memory to store a set of data. The first computer system may receive the set of data from the second computer system. In some embodiments, the first computer system reads the stored set of data from the memory and detects the pattern of errors by determining the differences between the read set of data and the set of data stored during the initializing.

In step 540, the first computer system generates a response dependent on the pattern of errors. In some cases, the response may identify the first computer system to the second computer system. In various embodiments, the first computer system provides the response identifying the first computer system to the second computer system as indicated in the CRA protocol. The first computer system may filter the pattern of errors to generate the response such that the response includes consistent errors and excludes inconsistent errors.

Figure 6:
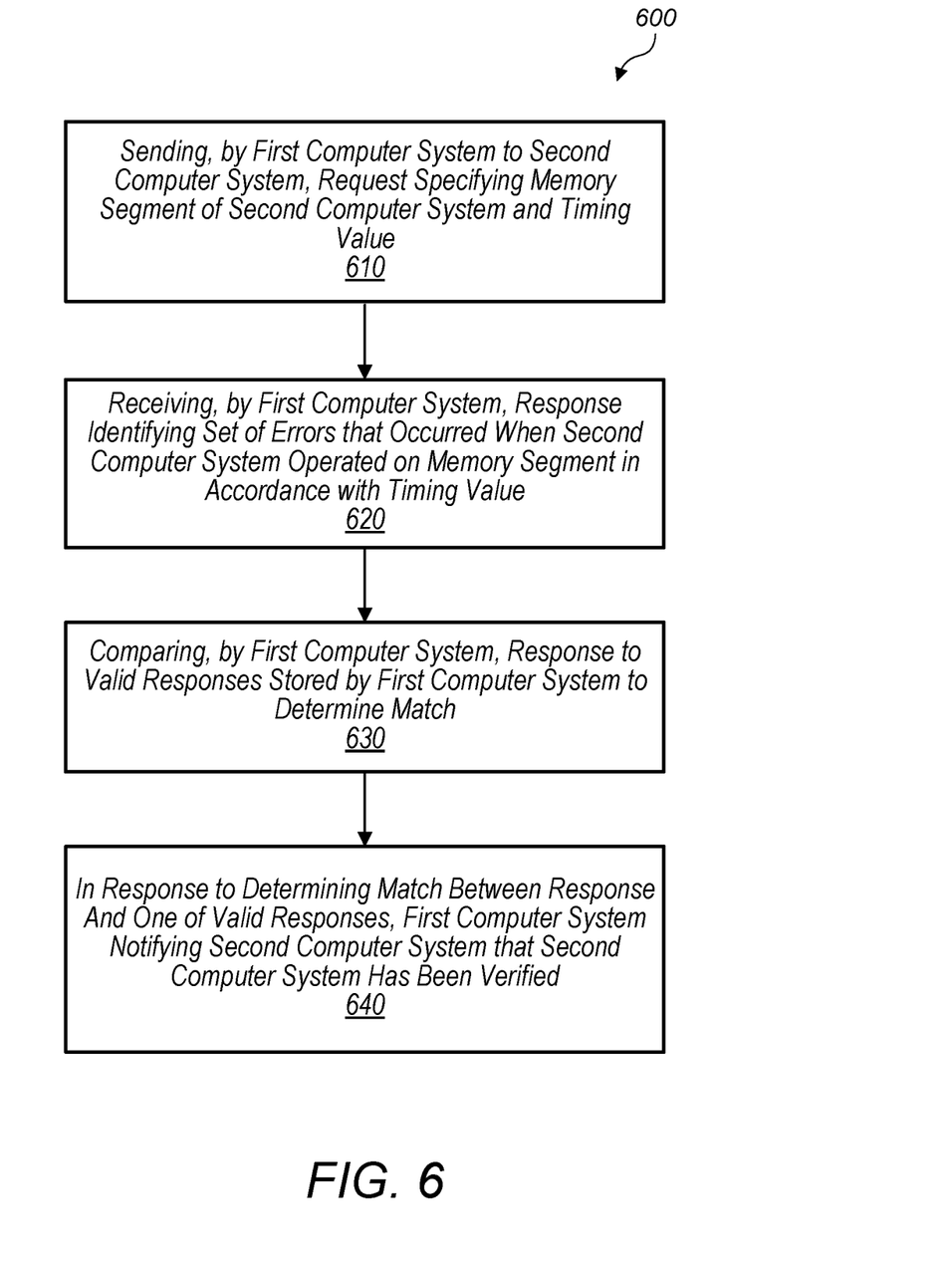
FIG. 6 is a flow diagram illustrating an exemplary method for determining whether a response generated based on a memory timing characteristic is a valid response, according to some embodiments.

Turning now to FIG. 6, a flow diagram of a method 600 is shown. Method 600 is one embodiment of a method performed by a first computer system (e.g., system 310) to verify (or identify) a second computer system (e.g., system 320) based on a response (e.g., response 350) provided by the second computer system. In various embodiments, the steps of method 500 may include additional steps—e.g., receiving a request access to resources stored by the first computer system.

Method 600 begins in step 610 with the first computer system sending a request (e.g., challenge 340) to the second computer system that specifies a timing value such as tRCD. In some embodiments, the second computer system is configured to operate on the memory segment (e.g., test region 390) in accordance with the timing value. In some embodiments, prior to sending the request, the first computer system receives at least one memory segment selected by the second computer system based on effects of temperature variation on the at least one memory segment. In some cases, the at least one memory segment may be selected based on effects on the at least one memory segment satisfying a threshold value such as having an Intra-Jaccard index value greater than 0.8. In various embodiments, the first computer system pseudorandomly selects one of the at least one memory segments such that the selected memory segment is specified in the request sent to the second computer system. The timing value may correspond to a memory latency characteristic of a memory of the second computer system.

In step 620, the first computer system receives a response (in various cases, from the second computer system) identifying a set of errors (e.g., response 350) that occurred when the second computer system operated on the memory segment in accordance with the timing parameter. In some embodiments, the request and the response are part of a challenge-response authentication (CRA) protocol in which the first computer system seeks (or attempts) to verify the second computer system's identity based on errors that occur in a memory of the second computer system.

In step 630, the first computer system compares the response to valid responses that are stored by the first computer system in order to determine a match. In some embodiments, the first computer system iteratively sends requests specifying varying memory segments and varying timing values. In such embodiments, the first computer system stores responses that are received from the second computer system as valid responses to the respective requests. In some embodiments, the response specifies the memory segment operated on in accordance with the timing value.

In step 640, in response to determining a match between the response and one of the valid responses, the first computer system notifying (e.g., via notification 360) the second computer system that the second computer system has been verified.

Figure 7:
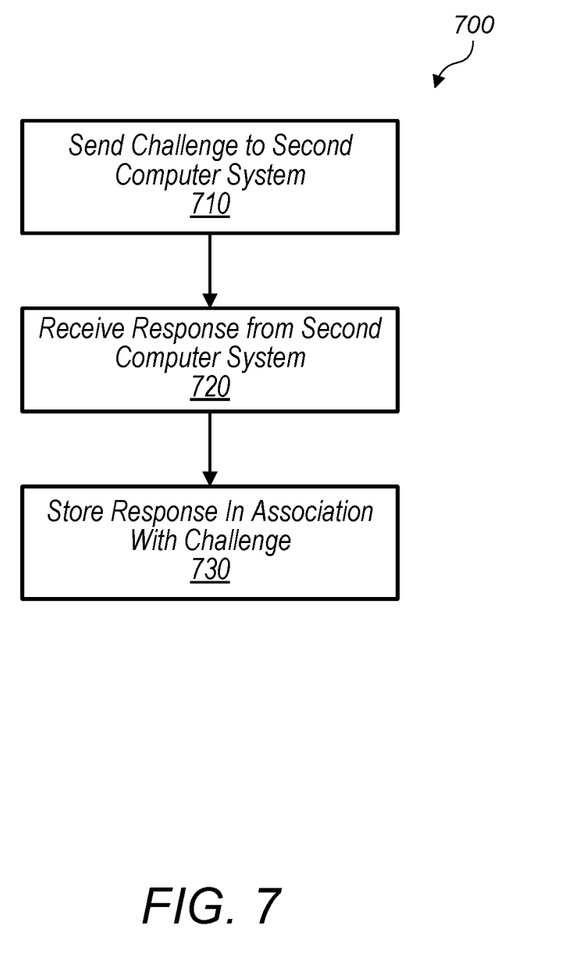
FIG. 7 is a flow diagram illustrating an exemplary method for enrolling a computer system, according to some embodiments.

Turning now to FIG. 7, a flow diagram of a method 700 is shown. Method 700 is one embodiment of a method performed by a first computer system (e.g., system 310) in order to enroll a second computer system (e.g., system 320) in, for example, a service provided by the first computer system. In various embodiments, the steps of method 700 include additional steps—e.g., selecting one of a plurality of challenges (e.g., challenge 340) to be sent to the second computer system.

Method 700 begins in step 710 with the first computer system sending, to the second computer system, a challenge. In step 720, the first computer system receives a response to the challenge from the second computer system. In step 730, the first computer system stores the response in association with the challenge. In various embodiments, the first computer system may perform method 700 multiple times with varied challenges in order to create a set of valid responses. After creating a set of valid responses, the first computer system may indicate to the second computer system that it has been enrolled. The method 700 may be performed when system 320 is known to be a valid device/system (e.g. while it is still in the facility where it was manufactured), avoiding the issue of a rogue system/device attempting to register itself in place of the system 320.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A first system, comprising:
   one or more processors; and
   memory having instructions stored therein that are executable by the one or more processors to cause the first system to perform operations comprising:
   receiving a request to identify the first system to a second system, wherein the request specifies a portion of the memory and a timing characteristic to be applied when performing operations on data stored at the portion of the memory, wherein the request is received as part of a challenge-response authentication (CRA) protocol in which the second system challenges the first system to provide a valid response that identifies the first system;
   in response to receiving the request, performing an operation on data stored at the portion of the memory in accordance with the timing characteristic;
   determining one or more errors associated with performing the operation, wherein a set of the one or more errors are usable to identify the first system; and
   sending, as part of the CRA protocol, a response usable to identify the first system, wherein the response includes the set of the one or more errors.

2. The first system of claim 1, wherein the memory includes:
   a plurality of cells configured to store electrical charges representative of logical bits; and
   a plurality of amplifiers configured to amplify the electrical charges to levels identifiable by the first system as the logical bits represented by the electrical charges, wherein the one or more errors result from a set of the plurality of amplifiers failing to amplify the electrical charges to the levels.

3. The first system of claim 1, wherein the operation includes reading data from the portion of the memory, and wherein the operations further comprise:
   prior to performing the operation, storing predetermined data at the portion of the memory, wherein the one or more errors indicate differences between the read data and the predetermined data.

4. The first system of claim 1, wherein the operations further comprise:
   iteratively performing the operation to determine errors that are consistently detected; and
   creating the set of the one or more errors by removing inconsistent errors from the one or more errors.

5. The first system of claim 1, wherein the operations further comprise:
   based on effects of temperature variation on portions of the memory, selecting a set of the portions, wherein the set of the portions includes the specified portion of the memory; and
   sending the set of the portions to the second system, wherein the second system is configured to send requests specifying ones from the set of the portions.

6. The first system of claim 1, wherein the operations further comprise:
   sending an access request for a resource stored by the second system; and
   in response to sending the access request, receiving the request to identify the first system to the second system.

7. A method, comprising:
   performing, by a first computer system, part of a challenge-response authentication (CRA) protocol involving a second computer system in which the second computer system challenges the first computer system to provide a valid response that identifies the first computer system, wherein the performing includes:
   programming a timing parameter of a memory accessible by the first computer system to a value that is outside of a specified operable range for the timing parameter;
   performing one or more memory operations to at least a portion of the memory;
   detecting a pattern of errors in the at least a portion of the memory;
   generating a response that is dependent on the pattern of errors, wherein the response identifies the first computer system; and
   providing, to the second computer system as part of the CRA protocol, the response that identifies the first computer system.

8. The method of claim 7, further comprising:
   determining, by the first computer system, a set of portions of the memory that are detected as causing patterns of errors having a similarity value satisfying a threshold value; and
   selecting, by the first computer system, the at least a portion of the memory on which to perform the one or more memory operations from the set of portions.

9. The method of claim 7, further comprising:
performing, by the first computer system, multiple iterations of the one or more memory operations to determine consistent and inconsistent errors; and
filtering, by the first computer system, the pattern of errors to generate the response, wherein the response includes the consistent errors and excludes the inconsistent errors.

10. The method of claim 7, further comprising:
initializing, by the first computer system, the at least a portion of the memory to store a set of data; and
wherein the one or more memory operations include reading the stored set of data, and wherein the detecting of the pattern of errors includes determining differences between the read set of data and the set of data stored during the initializing.

11. The method of claim 10, further comprising:
receiving, by the first computer system from the second computer system, the set of data stored during the initializing.

12. The method of claim 7, wherein the timing parameter is a Row Address to Column Address Delay (tRCD) associated with the memory.

13. A method, comprising:
sending, by a first computer system to a second computer system, a request specifying a timing value, wherein the second computer system is configured to operate on a memory segment in accordance with the timing value;
receiving, by the first computer system, a response identifying a set of errors that occurred when the second computer system operated on the memory segment in accordance with the timing value;
comparing, by the first computer system, the response to valid responses stored by the first computer system to determine a match; and
in response to determining a match between the response and one of the valid responses, the first computer system notifying the second computer system that the second computer system has been verified, wherein the request and the received response are part of a challenge-response authentication protocol in which the first computer system seeks to verify an identity of the second computer system based on errors that occur in a memory of the second computer system.

14. The method of claim 13, further comprising:
receiving, by the first computer system, at least one memory segment selected by the second computer system based on effects of temperature variation on the at least one memory segment, wherein the effects satisfy a threshold value; and
pseudorandomly selecting, by the first computer system, one of the at least one memory segment, wherein the request specifies the memory segment.

15. The method of claim 13, further comprising:
iteratively sending, by the first computer system, requests specifying varying memory segments and varying timing values; and
storing, by the first computer system, responses received from the second computer system as valid responses to the respective requests.

16. The method of claim 13, wherein the response specifies the memory segment operated on in accordance with the timing value.

17. The method of claim 13, wherein the timing value corresponds to a memory latency characteristic of a memory of the second computer system.

* * * * *